United States Patent [19]

Sakai

[11] Patent Number: 4,751,857
[45] Date of Patent: Jun. 21, 1988

[54] SYSTEM FOR CONTROLLING THE PRESSURE OF OIL IN A SYSTEM FOR AN INFINITELY VARIABLE TRANSMISSION

[75] Inventor: Yasuhito Sakai, Higashimurayama, Japan

[73] Assignee: Fuji Jukogyo Kabushiki Kaisha, Tokyo, Japan

[21] Appl. No.: 848,077

[22] Filed: Apr. 4, 1986

[30] Foreign Application Priority Data

Jun. 29, 1985 [JP] Japan ................................ 60-143467

[51] Int. Cl.⁴ .............................................. B60K 41/14
[52] U.S. Cl. ........................................ 74/867; 74/866
[58] Field of Search .................... 74/865, 866, 867, 868

[56] References Cited

U.S. PATENT DOCUMENTS

| 4,869,675 | 1/1983 | van Deursen | 74/864 |
| 4,417,641 | 11/1983 | Kageyama | 180/247 |
| 4,458,318 | 7/1984 | Smit et al. | 74/866 X |
| 4,459,879 | 7/1984 | Miki et al. | 474/18 X |
| 4,462,275 | 7/1984 | Mohl et al. | 74/866 |
| 4,466,521 | 8/1984 | Hattori et al. | 74/866 X |
| 4,475,416 | 10/1984 | Underwood | 74/868 |
| 4,481,877 | 11/1984 | Takano et al. | 192/32 X |
| 4,509,125 | 4/1985 | Fattic et al. | 74/866 X |
| 4,534,243 | 8/1985 | Yokoyama et al. | 74/867 X |
| 4,538,700 | 9/1985 | Suzuki | 180/249 X |
| 4,547,178 | 10/1985 | Hayakawa et al. | 74/867 X |
| 4,559,850 | 12/1985 | Sakakibara | 74/866 X |
| 4,562,897 | 1/1986 | Renneker | 192/58 B X |
| 4,565,110 | 1/1986 | Ito | 74/867 X |
| 4,582,159 | 4/1986 | Suzuki | 180/247 |
| 4,583,627 | 4/1986 | Kumura et al. | 192/76 |
| 4,584,907 | 4/1986 | Niwa et al. | 74/866 |
| 4,586,583 | 5/1986 | Yamakawa et al. | 180/247 |
| 4,605,112 | 8/1986 | Takano | 192/76 X |
| 4,663,991 | 5/1987 | Nakamura et al. | 74/866 X |

FOREIGN PATENT DOCUMENTS

| 58-88252 | 5/1983 | Japan. | |
| 59-159456 | 9/1984 | Japan. | |
| 2118666 | 11/1983 | United Kingdom | 180/247 |

Primary Examiner—Leslie A. Braun
Assistant Examiner—Dwight G. Diehl
Attorney, Agent, or Firm—Martin A. Farber

[57] ABSTRACT

A control system for an infinitely variable transmission has a line pressure control valve having ports and a spool for controlling the line pressure of oil supplied to a cylinder of a drive pulley to change the transmission ratio. The line pressure control valve has chambers. By controlling the pressure of oil supplied to the chambers in accordance with a desired line pressure, the spool is shifted, so that the line pressure is controlled.

5 Claims, 9 Drawing Sheets

(c)

(b)

(a)

F I G. 5
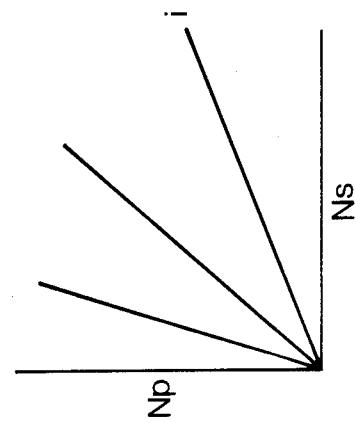
(c)
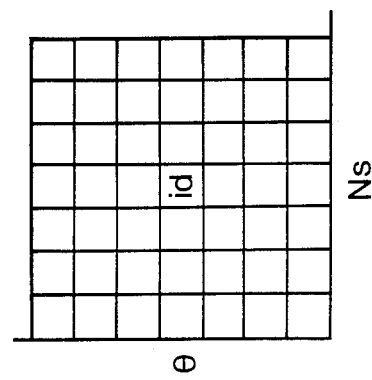
(b)
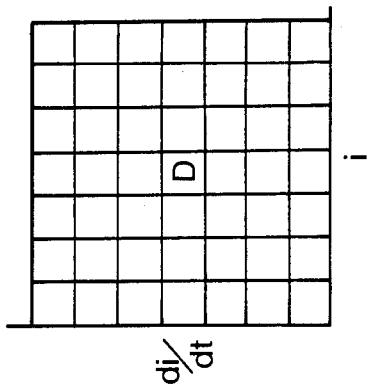
(a)

(f)

(e)

(d)

SYSTEM FOR CONTROLLING THE PRESSURE OF OIL IN A SYSTEM FOR AN INFINITELY VARIABLE TRANSMISSION

BACKGROUND OF THE INVENTION

The present invention relates to a control system for an infinitely variable belt-drive automatic transmission for a motor vehicle, and more particularly to a system for controlling the line pressure in a hydraulic circuit for the transmission.

A known control system for an infinitely variable belt-drive transmission disclosed in U.S. Pat. No. 4,369,675 comprises an endless belt running over a drive pulley and a driven pulley. Each pulley comprises a movable conical disc which is axially moved by a fluid operated servo device so as to vary the running diameter of the belt on the pulleys in dependency on driving conditions. The system is provided with a line pressure control valve and a transmission ratio control valve. Each valve comprises a spool to control the oil supplied to the servo devices.

The transmission ratio control valve operates to determine the transmission ratio in accordance with the opening degree of the throttle valve of the engine and the speed of the engine. The line pressure control valve is adapted to control the line pressure in accordance with the transmission ratio and the engine speed. The output of an engine is transmitted to the drive pulley through a clutch. The line pressure is controlled to prevent the belt from slipping on the pulleys in order to transmit the output of the engine.

At starting of the vehicle, the transmission ratio is set at a maximum value. When the vehicle speed and engine speed reach at set values under a driving condition, the transmission ratio starts to change (to upshift). At that time if the engine speed is kept constant, the transmission ratio is automatically and continuously reduced at a speed which is determined by line pressure, the pressure of oil supplied to the servo device of the drive pulley, and the actual transmission ratio. In such a system, the speed of the changing of transmission ratio up to a desired transmission ratio can not be controlled in accordance with driving conditions. Accordingly, hunting or overshooting of the transmission ratio occurs, which causes the driveability of the vehicle to reduce. In addition, since the line pressure changes stepwisely, shocks occur at the change of transmission ratio.

Japanese Patent Laid Open No. 58-88252 discloses a control system provided with a torque motor for operating a line pressure control valve. Such a system is not practical, since a source for driving the torque motor must be provided.

Japanese Patent Laid Open No. 59-159456 discloses the system provided with a first valve for changing the direction of the transmission ratio change and a second valve for controlling the transmission ratio changing speed. By controlling the spool of the second valve, the transmission ratio changing speed is controlled. However, the system is complicated in construction, since two control valves are provided in addition to the conventional system. Further, the publication does not disclose a system for controlling the changing speed of the line pressure.

SUMMARY OF THE INVENTION

An object of the present invention is to provide a system which may smoothly operate a transmission ratio control valve and a line pressure control valve, thereby providing proper line pressure for smoothly changing the transmission ratio.

The other objects and features of this invention will be understood from the following description with reference to the accompanying drawings.

DETAILED DESCRIPTION OF THE PREFERRED EMBODIMENT

Figure 1:
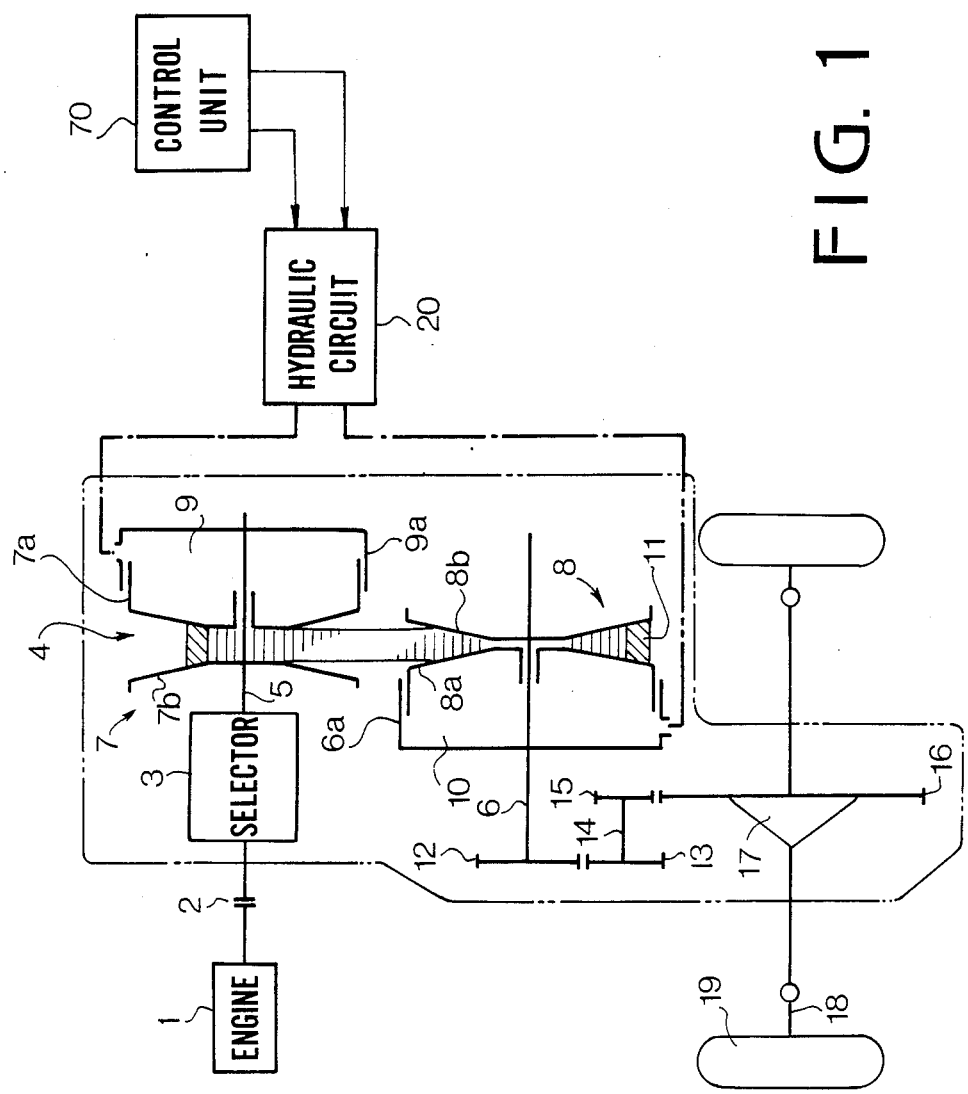
FIG. 1 is a schematic illustration of an infinitely variable belt-drive transmission.

Referring to FIG. 1, the infinitely variable belt-drive automatic transmission for a motor vehicle to which the present invention is applied comprises an electromagnetic powder clutch 2 for transmitting the power of an engine 1 to a transmission 4 through a selector mechanism 3.

The belt-drive transmission has a main shaft 5 and an output shaft 6 provided in parallel with the main shaft 5. A drive pulley (primary pulley) 7 and a driven pulley (secondary pulley) 8 are mounted on the shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite the movable conical disc 8a has a cylindrical portion which is slidably engaged in a cylinder 6a of the output shaft 6 to form a servo device. A chamber 10 of the servo device is also communicated with the hydraulic control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final reduction gear 16. The rotation of the final reduction gear 16 is transmitted to axles 18 of vehicle driving wheels 19 through a differential 17.

Figure 2A:
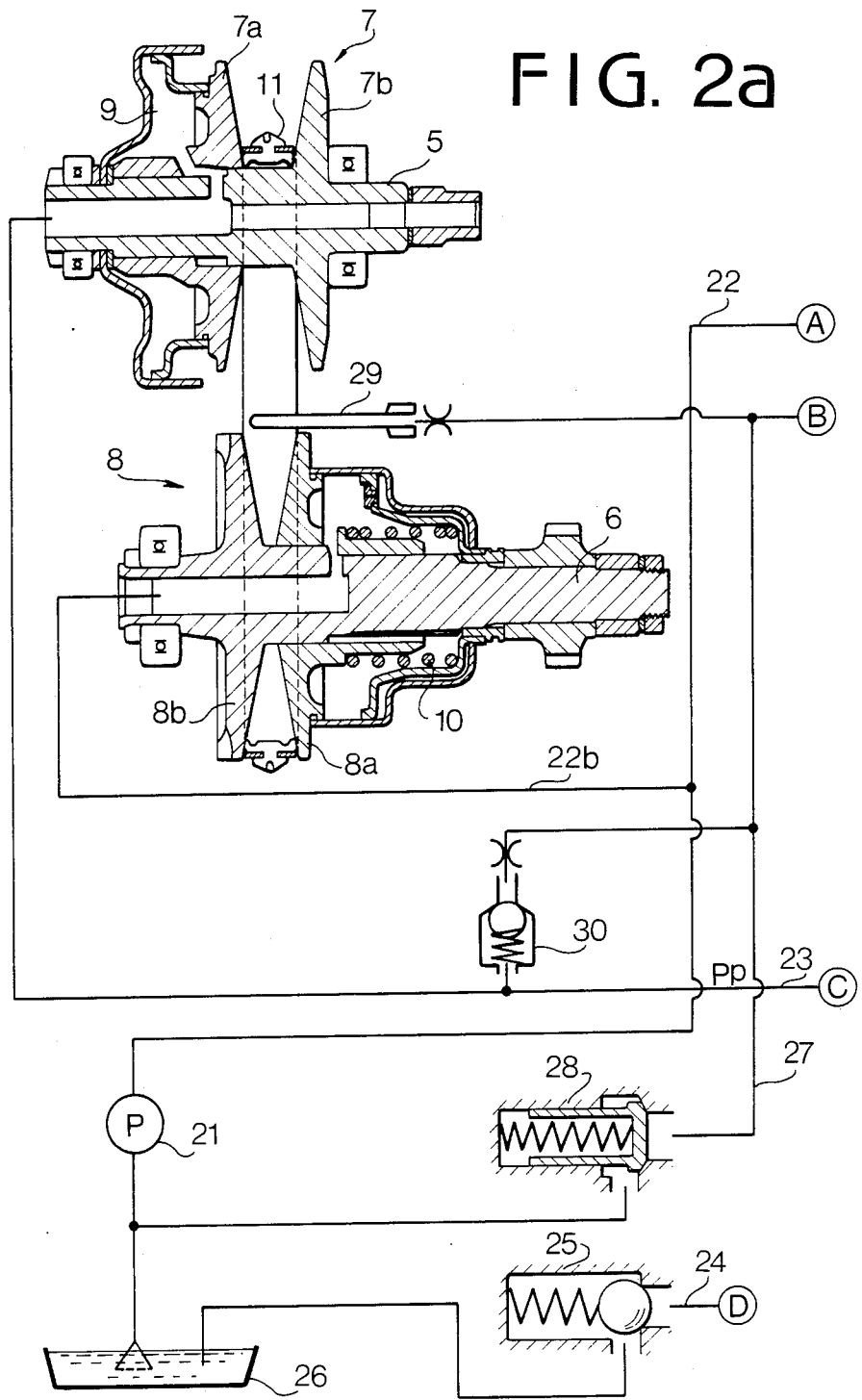
FIGS. 2a to 2c are schematic diagrams showing a control system according to the present invention.
Figure 2B:
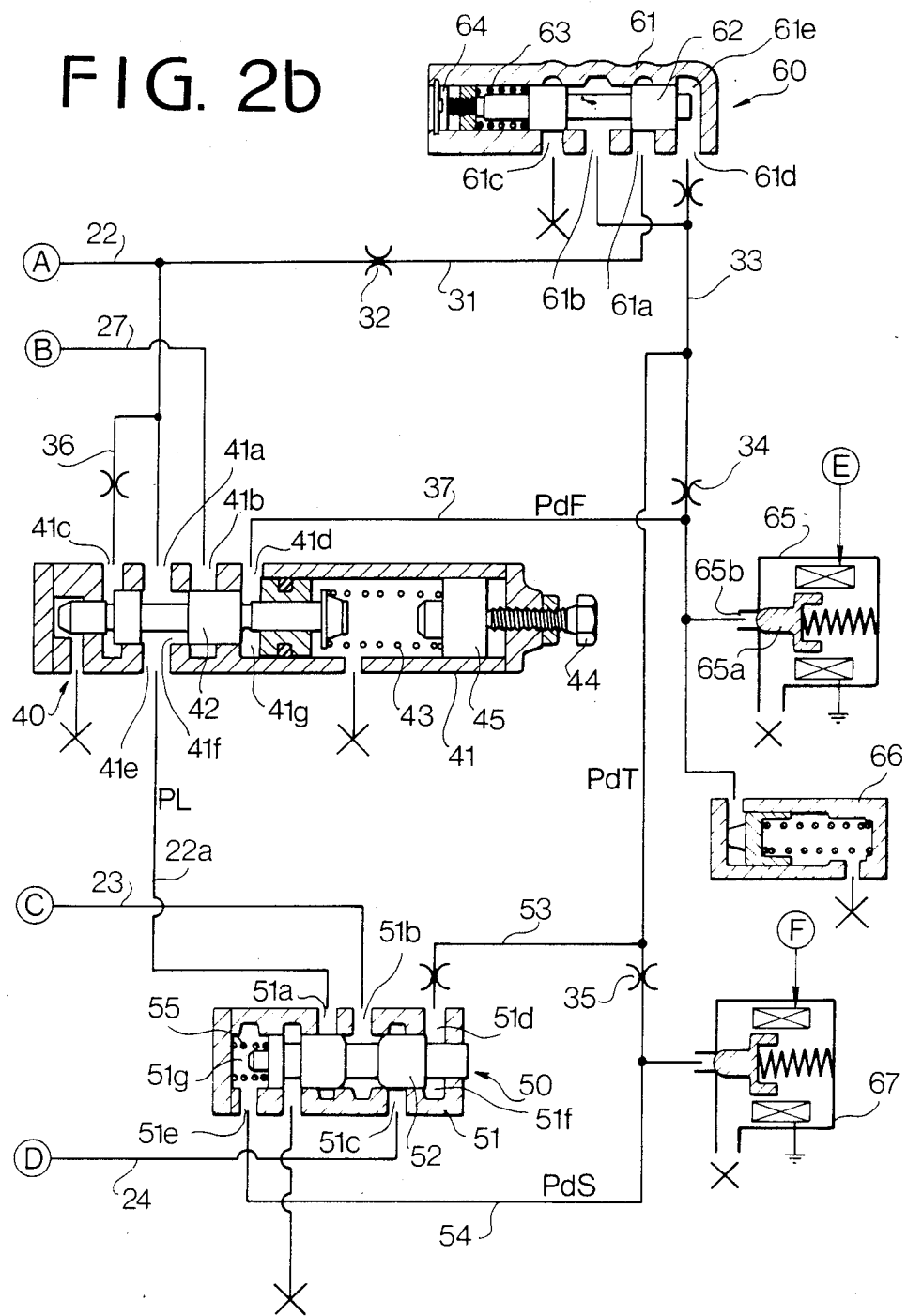
Figure 2C:
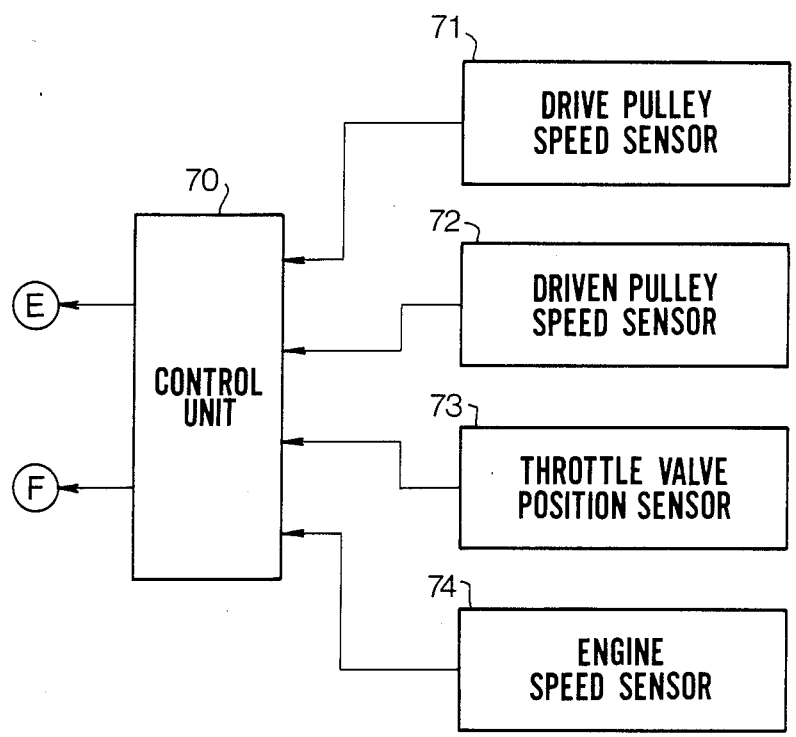

Referring to FIGS. 2a to 2c, chamber 9 of the drive pulley 7 is applied with pressurized oil by an oil pump 21 from an oil reservoir 26 passing through a line pressure conduit 22, the parts 41a and 41e of the line pressure control valve 40, the transmission ratio control valve 50, and conduit 23. The chamber 10 of the driven pulley 8 is applied with pressurized oil through a passage 22b without passing through the valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and ports 41c and 41d and chambers 41f and 41g. The spool 42 is applied with the pressure of the pressurized oil in a chamber communicating with the port 41c supplied through a conduit 46. The spool 42 is urged to the left by the force of a spring 43 provided between one end of the spool and a retainer 45, the position of which is adjustable by a screw 44. The port 41a is communicated with a port 41b of a drain passage 27 in accordance with the position of a land of the spool 42.

The transmission ratio control valve 50 comprises a valve body 51, spool 52, and spring 55 for urging the spool in the downshift direction. A port 51b of the valve body 51 is selectively communicated with a pressure oil supply port 51a or a drain port 51c in accordance with the position of lands of spool 52. Port 51b communicates with the chamber 9 through the conduit 23, and the port 51a communicates with the line pressure control valve 40 through conduit 22a. The drain port 51c is communicated with the oil reservoir 26 through a conduit 24 and check valve 25. The drain port 41b of the line pressure control valve communicates with the oil reservoir 26 through conduit 27 and a lubricating oil pressure providing valve 28. The conduit 27 is further communicated with the conduit 23 through a check valve 30. A part of the oil in the conduit 27 is supplied to the pulley 8 from a nozzle 29 to lubricate the pulley device.

The system of the present invention is provided with a pressure reducing valve or pressure control valve 60, and solenoid operated on-off control valves 65 and 67. The pressure control valve 60 comprises a valve body 61, spool 62, ports 61a, 61b and 61c, end chamber 61d, and spring 63 urging the spool 62 toward a chamber 61c. The load of the spring 63 can be adjusted by a screw 64. The port 61a is connected to the conduit 22 by a conduit 31 having an orifice 32, and the ports 61b and 61d are connected to a conduit 33. When the pressure of the oil in the conduit 33 reduces, the spool 62 is shifted to the right by the spring 63, so that the port 61a communicates with the port 61b to increase the pressure in the conduit 33. Thus, a constant pressure of oil is provided in the conduit 33.

The conduit 33 is communicated with the port 41d of the line pressure control valve 40 through an orifice 34 and a passage 47. The conduit 33 is also communicated with the reservoir 26 through the solenoid operated on-off valve 65 and with an accumulator 66. Further, the conduit 33 is communicated with ports 41d, 51e are controlled by changing the duty ratios of the control valve 50 through a passage 53 and with another end chamber 51g of the port 51e through a passage 54 having an orifice 35. A solenoid operated on-off valve 67 is connected to the passage 54 downstream of the orifice 35 so as to drain the oil to the reservoir 26. The solenoid operated valve 65 is adapted to be operated by pulses. When energized, a valve 65a opens a drain port 65b. The solenoid operated valve 67 is the same as valve 65 in construction and operation. The control valves 65 and 67 are operated by pulses from a control unit 70. Thus, pressures applied to the ports 41d, 51e are controlled by changing the duty ratios of the pulses supplied to the control valves 65 and 67.

In the line pressure control valve 40, the relationship among spring load $F_S$ and line pressure PL, line pressure receiving area SL of the spool, first control pressure $P_dF$ at the port 41d, and control pressure receiving area $S_d$ is as follows:

$$F_S + P_dF \cdot S_d = PL \cdot SL$$

$$PL = (P_dF \cdot S_d + F_s)/SL$$

Figure 4:
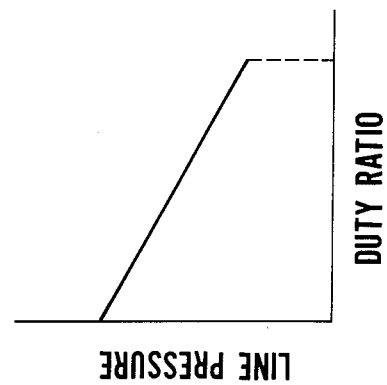
FIGS. 4a to 4c are graphs showing relationships between control pressure line pressure and duty ratio.
Figure 4:
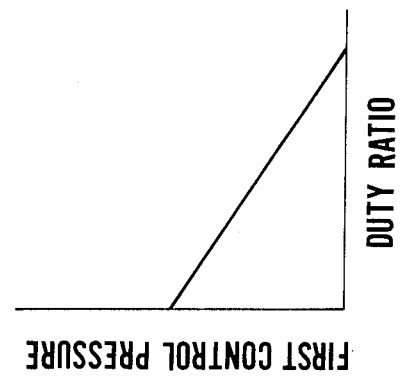
Figure 4:
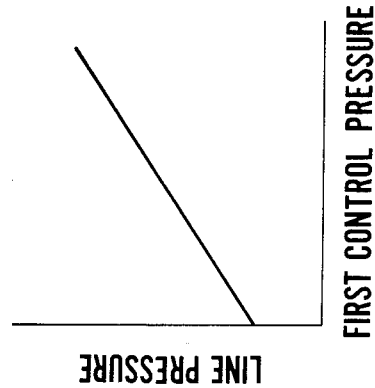

Accordingly, the line pressure PL is proportional to the control pressure $P_dF$, as shown in FIG. 4a.

In the transmission ratio control valve 50, the pressure receiving area of the spool 52 at chamber 51g is set to a value larger than the area at the chamber 51f. On the other hand, a second control pressure $P_dS$ in the chamber 51g can be changed between a maximum value, which is the same as a third control pressure $P_dT$ in the chamber 51f when the duty ratio of pulses supplied to control valve 67 is 0%, and a minimum value by controlling the duty ratio of the pulses for operating the control valve 67. FIG. 4b shows the relationship between the duty ratio and the first control pressure $P_dF$, and FIG. 4c shows the relationship between the duty ratio and the line pressure PL. The transmission ratio control valve 50 is so arranged that the spool 52 is at a neutral position at a middle duty ratio (for example 50%) and is located in an oil supply position by increasing the duty ratio from the middle duty ratio because of reduction of control pressure in the chamber 51g. Further, the speed of movement of the spool increases with decreasing duty ratio. The spool 52 is shifted to an oil drain position by decreasing the duty ratio. It will be understood that when the oil is supplied to the chamber 9, the transmission is upshifted.

The relationship between the duty ratio (D) of the pulses applied to the solenoid operated control valve 67 and the transmission ratio (i) is explained hereinafter.

The transmission ratio changing speed (di/dt) is a function of flow rate Q of oil supplied to the chamber 9, and the flow rate Q is a function of the duty ratio D, the line pressure PL and primary pressure $P_p$ in the chamber 9, namely:

$$di/dt = F(Q) = F(D, PL, P_p)$$

The line pressure PL is determined by the transmission ratio i and engine torque, and the primary pressure $P_p$ in the chamber 9 is determined by the transmission ratio i and the line pressure PL. Accordingly, assuming the engine torque to be constant, $$di/dt = f(D, i)$$

$$D = f(di/dt, i)$$

Accordingly, the duty ratio is determined by the transmission ratio changing speed di/dt and the transmission ratio i. On the other hand, the transmission ratio changing speed di/dt is dependent on the difference between the actual transmission ratio i and a desired transmission ratio id, $$di/dt = K (id - i)$$

where K is a coefficient

Accordingly, if the transmission ratio changing speed $di/dt$ is determined, the duty ratio D can be obtained from the speed. When the actual transmission ratio i is larger than the desired transmission ratio id ($i>$id), the value of $di/dt$ is negative. In such a state, the duty raio D is increased to reduce the pressure in the chamber $51g$ so as to upshift the transmission. The downshift is performed in the reverse manner.

Figure 3A:
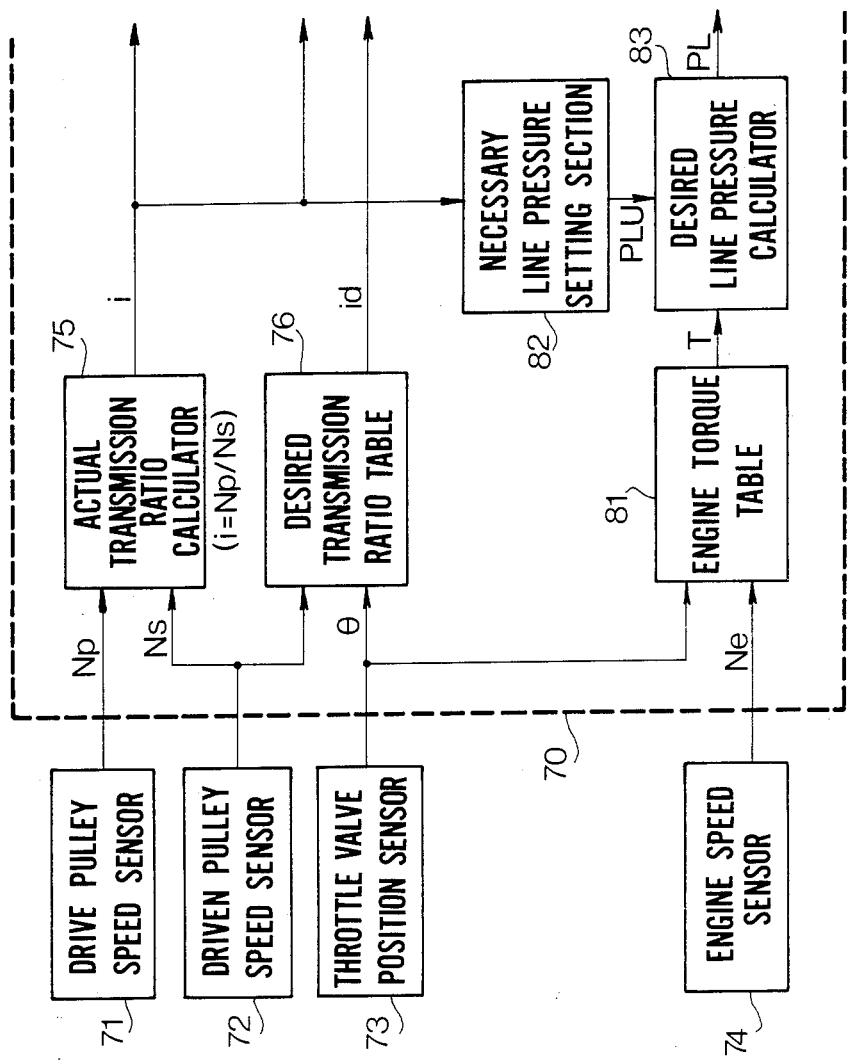
FIGS. 3a and 3b show a block diagram showing a control unit.
Figure 3B:
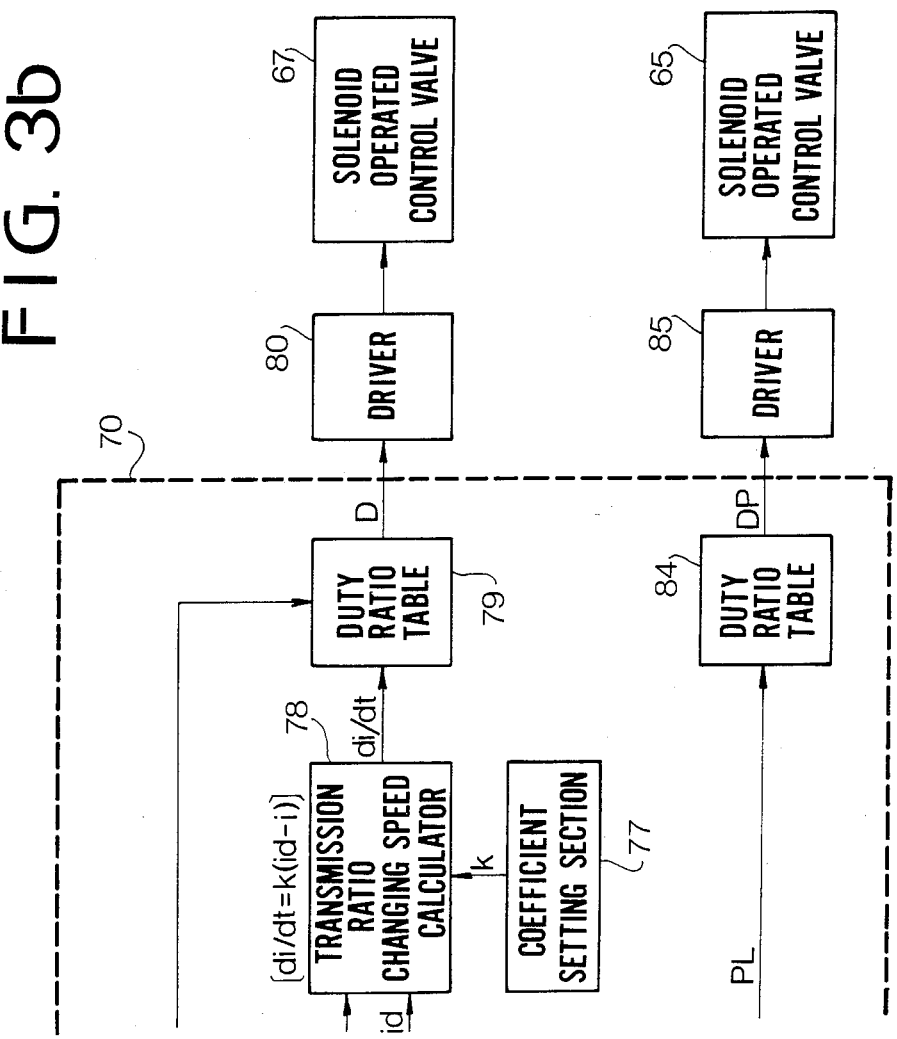
Figure 5:
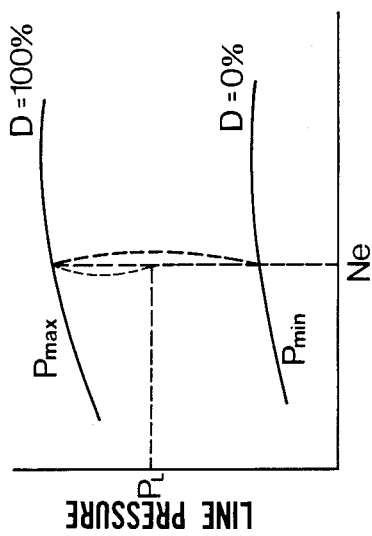
FIG. 5a shows various transmission ratios.
FIGS. 5b and 5c are tables storing desired transmission ratio (id) and duty ratio (D)
FIG. 5d is an engine torque table.
FIG. 5e is a graph showing the relationship between actual transmission ratio and desired line pressure.
FIG. 5f is a graph showing duty ratio for line pressure.
Figure 5:
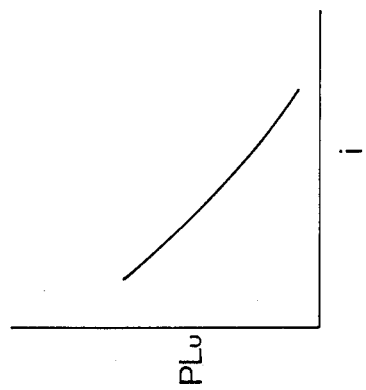
Figure 5:
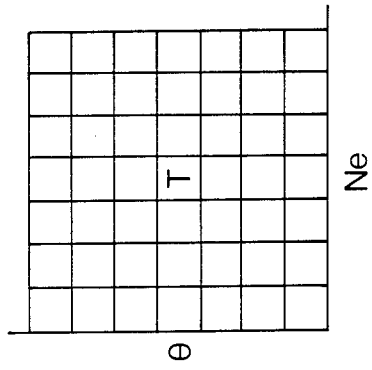

Referring to FIGS. 3a and 3b, the system is arranged to control the transmission ratio in accordance with the above described principle. In the system, a drive pulley speed sensor 71, driven pulley speed sensor 72, engine speed sensor 74 and throttle valve position sensor 73 are provided. Output signals $N_p$ and $N_s$ are fed to an actual transmission ratio calculator 75 to produce an actual transmission ratio i in accordance with $i=N_p/N_s$. The output signal $N_s$ of the sensor 72 and the output signal $\theta$ of the throttle valve position sensor 73 are fed to a desired transmission ratio table 76. FIG. 5a shows various actual transmission ratios i and FIG. 5b shows the table 76. The desired transmission ratio id is fetched from the table in accordance with the signals $N_s$ and $\theta$. The actual ratio i, desired ratio id and coefficient K from a coefficient setting section 77 are applied to a transmission ratio changing speed calculator 78 to produce a transmission ratio changing speed $di/dt$ from the formula $di/dt=K(id-i)$.

The speed $di/dt$ and the actual ratio i are applied to a duty ratio table 79 to derive the duty ratio D of pulses for the control valve 67. FIG. 5c shows the duty ratio table in which the duty ratio decreases with increases of speed $di/dt$ and ratio i. The duty ratio D is supplied to the solenoid operated valve 67 through a driver 80.

On the other hand, an output signal Ne of the engine speed sensor 74 and throttle position signal are fed to an engine torque table 81 to derive engine torque T of FIG. 5d. On the other hand, the actual ratio i is applied to a necessary line pressure setting section 82 which produces a necessary line pressure $PL_u$ from a graph of FIG. 5e. The necessary line pressure $PL_u$ and engine torque T are fed to a desired line pressure calculator 83 to produce desired line pressure PL dependent on $PL=PL_u \times T$. The desired line pressure PL is applied to a duty ratio setting section 84 to produce a duty ratio DP dependent on the desired line pressure. FIG. 5f shows the duty ratio dependent on engine speed Ne and desired line pressure PL. The duty ratio DP is obtained by a the following formula, with detecting maximum and minimum line pressures from the graph of FIG. 5f, DP=(Pmax−PL)/(Pmax−Pmin)

The duty ratio DP is applied to the solenoid operated valve 65 through a driver 85.

In operation, while the vehicle is at a stop, chamber 10 of the driven pulley is supplied with line pressure through conduit 22b, and the chamber 9 of the drive pulley is drained, since the $N_p$, $N_s$, $\theta$ are zero and duty ratio is zero, so that the spool 52 is at the right end position and the drain port 51c communicates with the chamber 9 through the conduit 23 as shown in FIGS. 2a and 2b. Thus, in the pulley and belt device of the infinitely variable belt-drive transmission, the driving belt 11 engages with the driven pulley 8 at a maximum running diameter to provide the largest transmission ratio (low speed stage). When the accelerator pedal is depressed, the electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started.

At that time the line pressure PL is at the highest value by the line pressure control valve 40, since the duty ratio DP for the valve 65 is small, and the spool 42 of the control valve 40 is at the left end position. When the throttle valve is opened for acceleration, the desired transmission ratio id and transmission ratio changing speed $di/dt$ are calculated by calculators 76, 78, and the duty ratio D is obtained from the table 79. The value of the duty ratio D is larger than the neutral value, so that the pressure in the chamber $51f$ of the control valve 50 is higher than the chamber $51g$. Thus, the spool 52 is shifted to the left to communicate the port $51a$ with the port $51b$, the so that oil is supplied to the chamber 9 through the conduit 23. On the other hand, duty ratio DP for the control valve 65 is increased, so that the pressure in the chamber $41g$ becomes low to shift the spool 42 of the valve 40 to the right. Accordingly, the port $41a$ communicates with the port $41b$ of the drain passage 27. Thus, line pressure reduces, and the transmission is upshifted, since oil is still supplied to the chamber 9 through the control valve 50. As the difference between the desired ratio id and the actual ratio i becomes large, the duty ratio D for the control valve 67 becomes large, thereby increasing the transmission changing speed $di/dt$. When the opening degree of the throttle valve is reduced for deceleration, the duty ratio D is reduced, thereby shifting the spool 52 to the right to drain the chamber 9. Thus, the transmission is downshifted. The transmission ratio changing speed at downshifting increases with reduction of the duty ratio.

In accordance with the present invention, since the line pressure is controlled to change continuously in accordance with a desired line pressure, the transmission ratio is smoothly changed in dependency on driving conditions of a vehicle.

While the presently preferred embodiment of the present invention has been shown and described, it is to be understood that this disclosure is for the purpose of illustration and that various changes and modifications may be made without departing from the scope of the invention as set forth in appended claims.

What is claimed is:

1. In a control system for an infinitely variable transmission for transmitting power of an internal combustion engine, the transmission comprising a drive pulley having a hydraulically shiftable disc and a first hydraulic cylinder for shifting the disc, a driven pulley having a hydraulically shiftable disc and a second hydraulic cylinder for operating the disc of the driven pulley, and a belt engaged with both pulleys, the system comprising a first hydraulic circuit having first passage means and a pump for supplying oil through the first passage means to the first and second hydraulic cylinders, a line pressure control valve in the first hydraulic circuit and having a first spool for controlling line pressure of the oil supplied by the pump, a transmission ratio control valve in the first hydraulic circuit and having a second spool for controlling the oil controlled by the line pressure control valve and supplied to the cylinder of the drive pulley to change the transmission ratio, the improvement comprising:

a second hydraulic circuit having a pressure control valve, the latter communicating with the pump so as to receive oil supplied from the pump with pressure of the oil supplied from the pump, and said pressure control valve being operative to reduce therein the pressure of the oil supplied from the pump to provide control oil having a constant pressure, and the second hydraulic circuit having second passage means for supplying the control oil to the line pressure control valve so as to shift the first spool;

control valve means provided in the second passage means for controlling the amount of the control oil supplied to the line pressure control valve;

sensing means for sensing operating conditions of the engine and the transmission and for producing signals dependent on the operating conditions;

first means responsive to the signals from the sensing means for producing an output signal;

second means responsive to the output signal for producing an operating signal for operating the control valve means, so that the shifting of the first spool of the line pressure control valve is controlled to control the line pressure.

2. The control system according to claim 1 wherein the control valve means is a solenoid operated on-off valve, and the operating signal of the second means is pulses, the duty ratio of which is changed so as to control the line pressure.

3. The control system according to claim 2, wherein
said first means comprises an engine torque table for providing engine torque from engine speed and throttle valve position of a throttle valve of the engine, a necessary line pressure setting section for setting a necessary line pressure from actual transmission ratio of the transmission and a desired line pressure calculator for providing a desired line pressure value in response to and by multiplying the engine torque and the necessary line pressure, and said second means comprises a duty ratio table for providing said duty ratio from said desired line pressure value.

4. The control system according to claim 1, wherein:
said second passage means further is for supplying the control oil to the transmission ratio control valve so as to shift the second spool;

another control valve means provided in the second passage means for controlling the amount of the control oil supplied to the transmission ratio control valve;

third means responsive to the signals from the sensing means for producing another output signal;

fourth means responsive to said another output signal for producing an operating signal for operating said another control valve means, so that shifting of the second spool of the transmission ratio control valve is controlled to control the transmission ratio.

5. The control system according to claim 1, further comprising
an accumulator communicating with said control valve means upstream of the latter and of said line pressure control valve.

* * * * *